(12) United States Patent
Miyamae et al.

(10) Patent No.: US 11,283,102 B2
(45) Date of Patent: Mar. 22, 2022

(54) LITHIUM SECONDARY BATTERY INCLUDING NONAQUEOUS ELECTROLYTE HAVING LITHIUM-ION CONDUCTIVITY

(71) Applicant: Panasonic Intellectual Property Management Co., Ltd., Osaka (JP)

(72) Inventors: Ryohei Miyamae, Osaka (JP); Akira Kano, Osaka (JP); Kensuke Nakura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 246 days.

(21) Appl. No.: 16/391,946

(22) Filed: Apr. 23, 2019

(65) Prior Publication Data

US 2019/0372152 A1    Dec. 5, 2019

(30) Foreign Application Priority Data

May 31, 2018  (JP) .............................. JP2018-105697

(51) Int. Cl.
*H01M 10/0525*  (2010.01)
*H01M 4/134*  (2010.01)
*H01M 4/38*  (2006.01)
*H01M 4/70*  (2006.01)
*H01M 4/02*  (2006.01)

(52) U.S. Cl.
CPC ....... *H01M 10/0525* (2013.01); *H01M 4/134* (2013.01); *H01M 4/382* (2013.01); *H01M 4/70* (2013.01); *H01M 2004/021* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| | | | | |
|---|---|---|---|---|
| 2010/0167111 A1* | 7/2010 | Sumihara | ................ | H01M 4/72 429/94 |
| 2012/0301783 A1* | 11/2012 | Shimada | ................ | H01M 4/70 429/211 |

(Continued)

FOREIGN PATENT DOCUMENTS

| JP | 2001-243957 | 9/2001 |
|---|---|---|
| JP | 2016-527680 | 9/2016 |

OTHER PUBLICATIONS

The Extended European Search Report dated Aug. 12, 2019 for the related European Patent Application No 19169178.1.

*Primary Examiner* — Brian R Ohara
(74) *Attorney, Agent, or Firm* — McDermott Will & Emery LLP

(57) ABSTRACT

A lithium secondary battery includes a positive electrode, a negative electrode, a separator, and a nonaqueous electrolyte having lithium-ion conductivity. A negative electrode current collector includes a layer having a first surface and a second surface opposite to the first surface, first protrusions protruding from the first surface, and second protrusions protruding from the second surface. The first and second surfaces are surfaces on which lithium metal is deposited during charge. When viewed in a direction of a normal to the first surface, a total area of overlap between the first protrusions and the second protrusions is ½ or less of a total area of the first protrusions.

14 Claims, 5 Drawing Sheets

(56) References Cited

U.S. PATENT DOCUMENTS

2015/0280212 A1 10/2015 Son et al.
2016/0013469 A1* 1/2016 Tajima .................... H01M 4/13
                                                              429/127
2020/0099087 A1* 3/2020 Nakagawa .......... H01M 10/058

* cited by examiner

LITHIUM SECONDARY BATTERY INCLUDING NONAQUEOUS ELECTROLYTE HAVING LITHIUM-ION CONDUCTIVITY

BACKGROUND

1. Technical Field

The present disclosure relates to a lithium secondary battery that includes a nonaqueous electrolyte having lithium-ion conductivity.

2. Description of the Related Art

Nonaqueous electrolyte secondary batteries have been used in the information and communications technologies (ICT), such as computers and smartphones, and for automotive use, power storage use, and the like. There has been a demand for a further increase in the capacities of nonaqueous electrolyte secondary batteries used in these applications. Known examples of high-capacity nonaqueous electrolyte secondary batteries include lithium ion batteries. Although it is possible to increase the capacity of a lithium ion battery by using, for example, graphite in combination with an alloy active material, such as a silicon compound, as a negative electrode active material of the lithium ion battery, the increases in the capacities of lithium ion batteries appear to be reaching their limits.

Lithium metal secondary batteries (hereinafter, referred to as "lithium secondary batteries") have the potential to serve as a nonaqueous electrolyte secondary battery having a higher capacity than lithium ion batteries. In a lithium secondary battery, lithium metal is deposited on a negative electrode during charge, while the lithium metal dissolves in a nonaqueous electrolyte during discharge.

There have been attempts to improve the shape and the like of a negative electrode current collector included in a lithium secondary battery in order to limit the degradation of the properties of the battery which may be caused by dendritic deposition of lithium metal on the negative electrode. For example, in Japanese Unexamined Patent Application Publication No. 2001-243957, the ten-point average irregularity Rz of the surface of the negative electrode current collector on which lithium metal is to be deposited is limited to be 10 μm or less. The lithium secondary battery proposed in Japanese Unexamined Patent Application Publication (Translation of PCT Application) No. 2016-527680 includes a negative electrode including a porous metal current collector and lithium metal intercalated in the pores of the current collector.

SUMMARY

One non-limiting and exemplary embodiment provides a lithium secondary battery capable of reducing the expansion of a negative electrode which may be caused by lithium metal deposited on the electrode during charge.

In one general aspect, the techniques disclosed here feature a lithium secondary battery including a positive electrode, a negative electrode, a separator, and a nonaqueous electrolyte having lithium-ion conductivity. The positive electrode contains a positive electrode active material containing lithium. The negative electrode faces the positive electrode, and includes a negative electrode current collector. The separator is disposed between the positive and negative electrodes. The negative electrode current collector includes a layer, first protrusions, and second protrusions. The layer has a first surface and a second surface opposite to the first surface. The first protrusions protrude from the first surface. The second protrusions protrude from the second surface. The first and second surfaces are surfaces on which lithium metal is deposited during charge. When viewed in a direction of a normal to the first surface, a total area of overlap between the first protrusions and the second protrusions is ½ or less of a total area of the first protrusions.

The lithium secondary battery according to an embodiment of the present disclosure may reduce the expansion of a negative electrode which may be caused by lithium metal deposited on the electrode during charge. Consequently, the lithium secondary battery according to the present disclosure may have an improved discharge capacity and improved safety.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1A:
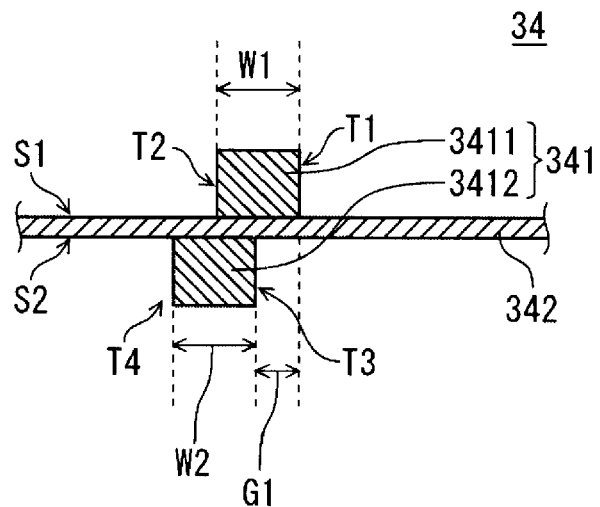
FIG. 1A is a schematic cross-sectional view of a part of a negative electrode current collector according to an embodiment of the present disclosure.

Underlying Knowledge Forming Basis of the Present Disclosure

The embodiments disclosed herein relate to a lithium secondary battery that includes lithium metal used as a negative electrode active material and specifically to improvement of a negative electrode current collector. While a lithium secondary battery is charged, lithium metal may be deposited on the negative electrode in a dendritic pattern. The formation of the dendrites results in an increase in the specific surface area of the negative electrode, which may lead to an increase in the occurrence of side reactions. As a result, the discharge capacity and cycle characteristic of a lithium secondary battery are likely to become degraded. In this regard, it is suggested in Japanese Unexamined Patent Application Publication No. 2001-243957 that setting the ten-point average irregularity Rz of the lithium deposition surface of the negative electrode to be 10 μm or less may reduce formation of the dendrites and enable a high charge/discharge efficiency.

The negative electrode of a lithium secondary battery is particularly likely to significantly expand as a result of lithium metal deposited on the negative electrode during charge. Note that, the expression "expansion of the negative electrode" used herein means an increase in the total volume of the negative electrode and lithium metal deposited on the negative electrode. The expansion of the negative electrode becomes particularly significant in the case where lithium metal is deposited on the negative electrode in a dendritic pattern. In order to absorb the expansion of the negative electrode which may occur during charge and discharge, for example, a porous negative electrode current collector that is composed of copper or nickel and has a porosity of 50% to 99% and a pore size of 5 to 500 μm is used in Japanese Unexamined Patent Application Publication (Translation of PCT Application) No. 2016-527680. However, it has been difficult to reduce the change in the volume of the negative electrode to a sufficiently low degree.

The inventors of the present invention conducted extensive studies in order to address the above issues and, as a result, conceived the lithium secondary battery according to the present disclosure. A lithium secondary battery according to an embodiment of the present disclosure includes a positive electrode containing a positive electrode active material containing lithium; a negative electrode facing the positive electrode, the negative electrode including a negative electrode current collector; a separator disposed between the positive and negative electrodes; and a nonaqueous electrolyte having lithium-ion conductivity. The negative electrode current collector includes a first surface, first protrusions protruding from the first surface, a second surface opposite to the first surface, and second protrusions protruding from the second surface. Each of the first and second protrusions has a line-like shape. Each of the first protrusions includes a first side surface and a second side surface opposite to the first side surface. The first and second side surfaces extend in the longitudinal direction of the first protrusion, the first side surface being closer to the first edge of the negative electrode current collector than the second side surface. The first and second surfaces are the surfaces of the negative electrode current collector on which lithium metal is deposited during charge. When viewed in the direction of the normal to the first surface, at least a region of each of the first protrusions which extends ½ of the distance between the first and second side surfaces from the first side surface toward the second side surface does not overlap any of the second protrusions.

In the lithium secondary battery according to the embodiment of the present disclosure, the line-like protrusions protruding from both surfaces of the negative electrode current collector enable spaces to be created in the vicinity of the surfaces of the negative electrode current collector, in which lithium metal may be deposited. This may reduce the change in the volume of the negative electrode which is caused by deposition of the lithium metal. In addition, even in the case where lithium metal is deposited in a dendritic pattern, the dendrites may be accommodated in the spaces created in the vicinity of the surfaces of the negative electrode current collector. Note that, in the case where the electrodes are wound, the expression "when viewed in the direction of the normal to a surface" used herein means that the surface is viewed in the direction of the normal to the surface while the electrode is unwound into a planar shape. Therefore, the term "overlap" between protrusions used herein does not apply to protrusions that overlap one another as a result of winding of an electrode. The term "closest" does not apply to protrusions the distance between which has become the shortest as a result of winding.

In the lithium secondary battery according to the embodiment of the present disclosure, furthermore, the protrusions are arranged such that at least specific regions of the protrusions protruding from one of the surfaces of the negative electrode current collector do not overlap the protrusions protruding from the other surface. Specifically, the first and second protrusions are arranged such that, when viewed in the direction of the normal to the first surface, a region of each of the first protrusions protruding from the first surface of the negative electrode current collector, the region extending ½ of the distance between the first and second side surfaces from the first side surface toward the second side surface, does not overlap any of the second protrusions. Hereinafter, the distance between the first and second side surfaces is referred to as "first width". The first side surface of each of the first protrusions extends in the longitudinal direction of the first protrusion and is closer to the first edge of the negative electrode current collector than the second side surface of the first protrusion.

Lithium metal may also be deposited on the surfaces of the protrusions and in the regions between the protrusions and the separator. Therefore, by the deposition of lithium metal, the thickness of the negative electrode is likely to become larger partially at the protrusions than at the other positions.

Lithium metal is particularly likely to be deposited on the periphery of the side surfaces of the protrusions and the periphery of surfaces of the protrusions which face but are not in contact with the separator. For example, the first and second protrusions are arranged such that, when viewed in the direction of the normal to the first surface, at least a region of each of the first protrusions does not overlap any of the second protrusions (hereinafter, such a region is referred to as "first protrusion region"). In such a case, the positions at which the thickness of the negative electrode current collector is increased by the deposition of lithium metal on one of the surfaces of the negative electrode current collector may be displaced from the positions at which the thickness of the negative electrode current collector is increased by the deposition of lithium metal on the other surface. This may reduce partial expansion of the negative electrode. Consequently, the expansion of the negative electrode may be reduced as a whole.

Since the first and second protrusions are arranged such that at least a region of each of the first protrusions does not overlap any of the second protrusions, the distance between two separators that are arranged to face each other across the negative electrode is likely to be uniform and, consequently, lithium metal is deposited while being uniformly pressed by the separators. This reduces the likelihood of lithium metal deposited in large amounts at particular positions and further limits the partial expansion of the negative electrode. In addition, the deposited lithium metal is also likely to be pressed uniformly by the separators. This may increase the conductivity between the lithium metal and the negative electrode current collector and enhance the charge/discharge efficiency.

It may be particularly useful to apply the technology disclosed herein to a lithium secondary battery that includes a multilayer electrode group produced by stacking plural sets of a positive electrode, a separator, and a negative electrode on top of one another or a wound electrode group produced by winding a positive electrode, a separator, and a negative electrode into a spiral. In the multilayer electrode group and the wound electrode group, lithium metal is deposited on both surfaces of the negative electrode current collector. Therefore, when protrusions are formed on both surfaces of the negative electrode current collector and the positions at which the protrusions are formed on one of the surfaces are displaced from those at which the protrusions are formed on the other surface, the partial expansion of the negative electrode which may be caused by the deposition of lithium metal may be reduced with effect.

When viewed in the direction of the normal to the first surface, each of the line-like protrusions has a shape such that the ratio of the length LL of the long side of a minimum rectangle that surrounds the protrusion to the length SL of the short side of the rectangle (LL/SL) is 2 or more.

The side surfaces of the protrusions do not face the separator and do not come into contact with the layer of the negative electrode current collector. The first width is the length between the first and second side surfaces. The first width is, specifically, in a cross-section of each of the first protrusions taken in a direction perpendicular to the longitudinal direction of the first protrusion, the length of a surface of the first protrusion which is in contact with the layer of the negative electrode current collector (hereinafter, this surface is referred to as "contact surface"). The first protrusion region may be determined on the basis of the contact surface in the cross-section of each of the first protrusions taken in a direction perpendicular to the longitudinal direction of the first protrusion.

The longitudinal direction of each of the protrusions is the direction of a straight line that connects the centers of the short sides of a minimum rectangle that surrounds the protrusion. The side surfaces of each of the protrusions which extend in the longitudinal direction are side surfaces of the protrusion which form an acute angle of 30° or less with the longitudinal direction of the protrusion when viewed in the direction of the normal to the surface of the negative electrode current collector.

While lithium metal is deposited on the side surfaces of the protrusions and on the periphery of the non-contact surfaces (i.e., the surfaces of the protrusions which face but are not in contact with the separator), it may also be deposited in regions that surround the side surfaces of the protrusions beyond the side surfaces and non-contact surfaces of the protrusions. Accordingly, in order to reduce expansion of the electrode, the first and second protrusions may be arranged such that the first protrusions are separated from the second protrusions when viewed in the direction of the normal to the first surface.

Specifically, each of the second protrusions may include a third side surface and a fourth side surface opposite to the third side surface. The third and fourth side surfaces extend in the longitudinal direction, the third side surface being closer to the first edge of the negative electrode current collector than the fourth side surface. In such a case, when viewed in the direction of the normal to the first surface, the distance between the second side surface of each of the first protrusions and the third side surface of a corresponding one of the second protrusions which is closest to the first protrusion may be ¼ or more or ½ or more of the distance P1 between each adjacent two of the first protrusions.

The distance P1 may be larger than the sum of the length between the third and fourth side surfaces of the second protrusions (hereinafter, this length is referred to as "second width") and the distance between the second side surface of each of the first protrusions and the third side surface of a corresponding one of the second protrusions. In such a case, when viewed in the direction of the normal to the first surface, each of the second protrusions is disposed in the space between two adjacent first protrusions. This may further reduce the partial expansion of the negative electrode. The distance P1 may be 3 times or more, 5 times or more, or 10 times or more the second width. From the same viewpoints as above, the distance P2 between each adjacent two of the second protrusions may be 3 times or more, 5 times or more, or 10 times or more the first width.

The second width is the length between the third and fourth side surfaces. Specifically, the second width is, in a cross-section of each of the second protrusions taken in a direction perpendicular to the longitudinal direction of the second protrusion, the length of a surface of the second protrusion which is in contact with the layer of the negative electrode current collector (hereinafter, this surface is referred to as "contact surface"). The distance between the second and third side surfaces and distances P1 and P2 may be determined on the basis of the contact surface in the cross-section of each of the second protrusions taken in a direction perpendicular to the longitudinal direction of the second protrusion.

Embodiment 1

Figure 1B:
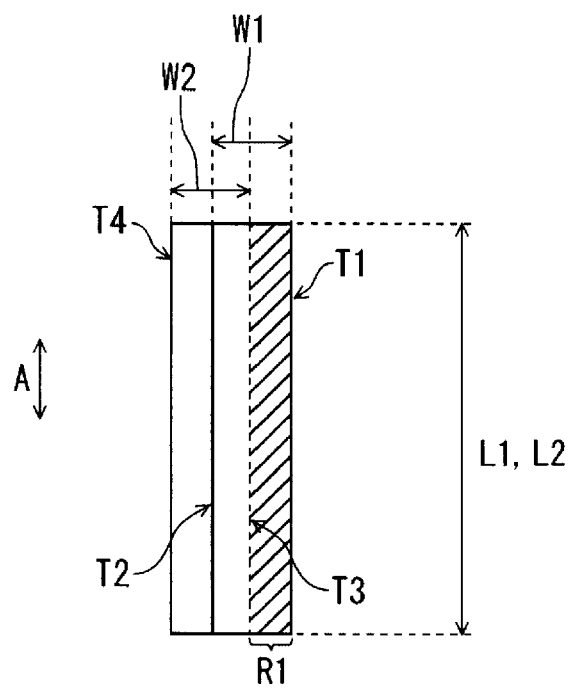
FIG. 1B is a schematic top plan view of the protrusions illustrated in FIG. 1A.

FIG. 1A is a schematic cross-sectional view of a negative electrode current collector according to an embodiment of the present disclosure. FIG. 1B is a schematic top plan view of the protrusions illustrated in FIG. 1A which is viewed from the first surface-side. Note that, in FIG. 1B, a conductive sheet 342 is not illustrated and a first protrusion region R1 is hatched.

A first protrusion 3411 protrudes from a first surface S1 of a negative electrode current collector 34. A second protrusion 3412 protrudes from a second surface S2 of the negative electrode current collector 34. The first protrusion 3411 and the second protrusion 3412 are arranged parallel to each other and have the same longitudinal direction A. The first protrusion 3411 includes a first side surface T1 and a second side surface T2 opposite to the first side surface T1. The first side surface T1 and the second side surface T2 are side surfaces of the first protrusion 3411 which extend in the longitudinal direction A. The second protrusion 3412 includes a third side surface T3 and a fourth side surface T4 opposite to the third side surface T3. The third side surface T3 and the fourth side surface T4 are side surfaces of the second protrusion 3412 which extend in the longitudinal direction A. The first side surface T1 of the first protrusion 3411 and the third side surface T3 of the second protrusion 3412 face in the direction to a first edge (not illustrated) of the negative electrode current collector 34.

The length L1 of the first protrusion 3411 in the longitudinal direction A is much larger than the first width W1 of the first protrusion 3411. That is, for example, $L1/W1 \geq 5$. The length L2 of the second protrusion 3412 in the longitudinal direction A is much larger than the second width W2 of the second protrusion 3412. That is, for example, $L2/W2 \geq 5$.

When viewed in the direction of the normal to the first surface S1, the first protrusion 3411 includes a first protrusion region R1 that does not overlap the second protrusion 3412. The distance between the first side surface T1 of the first protrusion 3411 and the third side surface T3 of the second protrusion 3412 (hereinafter, this distance is referred to as "gap G1") is ½ of the first width W1. The gap G1 may be ½ or more of the first width W1. In the case where the first width W1 is equal to the second width W2, the gap G1 is the distance between the center line that bisects the first width W1 of the first protrusion 3411 and the center line that bisects the second width W2 of the second protrusion 3412. In other words, the gap G1 may be determined on the basis of the above distance in the case where the first width W1 is equal to the second width W2.

Although the first protrusion 3411 and the second protrusion 3412 illustrated in the drawings as an example have the same shape, the shapes of the first protrusion 3411 and the second protrusion 3412 are not limited to this; the shapes of the first protrusion 3411 and the second protrusion 3412 may be identical to or different from each other.

The negative electrode current collector according to this embodiment may include first protrusions (that include the first protrusion 3411) and second protrusions (that include the second protrusion 3412). For example, the negative electrode current collector according to this embodiment includes a conductive sheet (i.e., an example of the layer) 342 that includes a first surface and a second surface opposite to the first surface, first protrusions protruding from the first surface, and second protrusions protruding from the second surface. During charge, lithium metal is deposited on the first and second surfaces. When viewed in the direction of the normal to the first surface, the total area of overlap between the first protrusions and the second protrusions may be ½ or less of the total area of the first protrusions. In other words, the area of portions of the first protrusions which do not overlap any of the second protrusions (see R1 in FIG. 1B) may be ½ or more of the total area of the first protrusions.

When viewed in the direction of the normal to the first surface, each of the first protrusions may have a line-like shape and include a first side and a second side opposite to the first side. The first and second sides extend in the longitudinal direction of the line-like shape (see T1 and T2 in FIG. 1B) and the first and second protrusions may be arranged such that a region of at least one of the first protrusions which extends ½ of the distance between the first and second sides from the first side toward the second side does not overlap any of the second protrusions (see R1 in FIG. 1B). Alternatively, the first and second protrusions may be arranged such that a region of each of the first protrusions which extends ½ of the distance between the first and second sides from the first side toward the second side does not overlap any of the second protrusions. When viewed in the direction of the normal to the first surface, each of the second protrusions may have a line-like shape.

The first protrusions may be composed of a material different from the material of which the conductive sheet 342 is composed. The second protrusions may be composed of a material different from the material of which the conductive sheet 342 is composed. The first and second protrusions may be composed of a resin material. The conductive sheet 342, the first protrusions, and the second protrusions may be formed in one piece using the same material.

Embodiment 2

Figure 2:
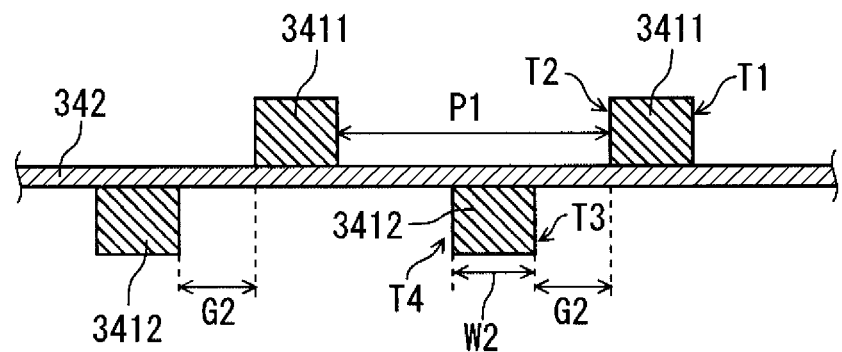
FIG. 2 is a schematic cross-sectional view of a part of a negative electrode current collector according to another embodiment of the present disclosure.

FIG. 2 is a schematic cross-sectional view of a negative electrode current collector according to another embodiment of the present disclosure. In this embodiment, when the first surface S1 is viewed in the direction of the normal to the first surface S1, first protrusions 3411 are separated from second protrusions 3412. That is, the first protrusions 3411 do not overlap the second protrusions 3412. The other structure of the negative electrode current collector is the same as in Embodiment 1.

The negative electrode current collector according to this embodiment may include first protrusions that include two adjacent first protrusions 3411 and second protrusions that include two adjacent second protrusions 3412. In such a case, the first and second protrusions may be arranged such that at least one of the first protrusions does not overlap any of the second protrusions when viewed in the direction of the normal to the first surface. Alternatively, the first and second protrusions may be arranged such that each of the first protrusions does not overlap any of the second protrusions when viewed in the direction of the normal to the first surface.

When viewed in the direction of the normal to the first surface, the distance between the second side surface T2 of each of the first protrusions 3411 and the third side surface T3 of a specific one of the second protrusions 3412, the third side surface T3 being closest to the second side surface of the first protrusion 3411 (hereinafter, this distance is referred to as "gap G2"), may be ¼ or more or ½ or more of the distance P1 between the two adjacent first protrusions 3411. The distance P1 may be larger than the sum of the second width W2 of the second protrusions 3412 and the gap G2.

In other words, when viewed in the direction of the normal to the first surface, the distance between the second side of each of the first protrusions 3411 (i.e., an example of the third protrusion) and the third side of a specific one of the second protrusions 3412 (i.e., an example of the fifth protrusion), the third side being closest to the second side, may be ¼ or more or ½ or more of the distance P1 between the two adjacent first protrusions 3411 (i.e., an example of the third and fourth protrusions). The negative electrode current collector may include a first edge. The first side of each of the first protrusions may be closer to the first edge than the second side of the first protrusion. Each of the second protrusions may have a line-like shape and includes a third side and a fourth side opposite to the third side. The third and fourth sides extend in the longitudinal direction of the line-like shape. The third side of each of the second protrusions may be closer to the first edge than the fourth side of the second protrusion.

When viewed in the direction of the normal to the first surface, the two adjacent first protrusions 3411 may be arranged in the first direction and the distance P1 may be larger than the sum of the distance between the second and third sides and the width of the second protrusions 3412 in the first direction.

Although the first protrusions 3411 and the second protrusions 3412 illustrated in the drawing as an example have the same shape, the shapes of the first protrusions 3411 and the second protrusions 3412 are not limited to this; the shapes of the first protrusions 3411 and the second protrusions 3412 may be identical to or different from each other.

The structure of the lithium secondary battery according to the embodiment is further specifically described below.

Negative Electrode

The negative electrode includes a negative electrode current collector. The negative electrode current collector may be the above-described negative electrode current collector according to Embodiment 1 or 2. The negative electrode current collector includes a first surface, first protrusions protruding from the first surface, a second surface opposite to the first surface, and second protrusions protruding from the second surface. While the lithium secondary battery is charged, lithium metal is deposited on the first and second surfaces. Specifically, while the lithium secondary battery is charged, lithium ions contained in a nonaqueous electrolyte receive electrons on the negative electrode current collector to form lithium metal, which is deposited on the surface of the negative electrode current collector. While the lithium secondary battery is discharged, the lithium metal deposited on the surface of the negative electrode current collector dissolves in the nonaqueous electrolyte to form lithium ions. The lithium ions contained in the nonaqueous electrolyte may be lithium ions derived from a lithium salt included in the nonaqueous electrolyte or lithium ions fed from the positive electrode active material while the lithium secondary battery is charged. In another case, the nonaqueous electrolyte may include both of the above types of lithium ions.

The negative electrode current collector includes the protrusions formed on the first and second surfaces. The first and second protrusions are arranged on the first and second surfaces, respectively, such that at least a portion of the first protrusion does not overlap the second protrusion when viewed in the direction of the normal to the first surface. In such a case, the positions at which the thickness of the negative electrode current collector increases as a result of the deposition of lithium metal on both surfaces of the negative electrode current collector can be displaced from each other. This may reduce partial expansion of the negative electrode and, consequently, expansion of the negative electrode as a whole.

The negative electrode current collector may include two or more first protrusions formed on the first surface. The negative electrode current collector may include two or more second protrusions formed on the second surface. In such a case, the condition that the first and second protrusions are arranged on the first and second surfaces, respectively, such that at least a portion of the first protrusion does not overlap the second protrusion is considered to be satisfied when at least one of the first protrusions or at least one of the second protrusions satisfies the condition; all of the first protrusions and all of the second protrusions do not necessarily satisfy the condition. In order to further reduce the expansion of the negative electrode, for example, when viewed in the direction of the normal to the first or second surface, 80% or more of the total area of the first or second protrusions may satisfy the above condition. All of the protrusions may satisfy the above condition.

The area of the protrusions may be determined before the negative electrode current collector is formed into an electrode group. In the case where the area of the protrusions is determined after the negative electrode current collector has been removed from the electrode group, the area of protrusions included in a particular region of the negative electrode current collector may be calculated and the area fraction of the protrusions which is determined on the basis of the area of the above protrusions may be considered as the above area fraction.

Note that, the term "protrusions" used herein refers to at least one of the first protrusions and the second protrusions, unless otherwise specified. Each of the protrusions protrudes from one of the surfaces of the negative electrode current collector toward the surface of a separator that faces the surface of the negative electrode current collector. In the case where protrusions are formed on the negative electrode current collector, at least some of the protrusions may be in contact with the separator. The presence of the protrusions enables spaces to be created between the negative electrode current collector and the separator. Lithium metal is deposited in the spaces during charge. That is, the likelihood of lithium metal deposited between the protrusions and the separator may be reduced. This may further reduce the partial expansion of the negative electrode.

In order to further reduce the expansion of the negative electrode, for example, 80% or more of the area of the first or second protrusion viewed in the direction of the normal to the first or second surface (in the case where first or second protrusions are present, the total area of the first or second protrusions viewed in the direction of the normal to the first or second surface) may come into contact with the separator. Alternatively, the entirety of the protrusions may come into contact with the separator. Hereinafter, the area of the first or second protrusion viewed in the direction of the normal to the first or second surface (in the case where first or second protrusions are present, the total area of the first or second protrusions viewed in the direction of the normal to the first or second surface) is referred to as "the area of the protrusion".

The protrusions have a line-like shape. The protrusions make it easy to hold the separator and may reduce the likelihood of the nonaqueous electrolyte being distributed unevenly on the first surface.

The longitudinal direction of the line-like protrusions may extend in the longitudinal direction of the negative electrode current collector. In such a case, the first edge of the negative electrode current collector is an edge of the negative electrode current collector which extends in the longitudinal direction of the negative electrode current collector. The expression "the longitudinal direction of the protrusions extends in the longitudinal direction of the negative electrode current collector" used herein means that the longitudinal direction of the protrusion forms an acute angle of 30° or less with the longitudinal direction of the negative electrode current collector.

The line-like protrusions may be protrusions that connect two opposite outer edges of the negative electrode current collector to each other (hereinafter, such protrusions are referred to as "stripe-like protrusions") or may be protrusions that do not connect two opposite outer edges of the negative electrode current collector to each other (hereinafter, such protrusions are referred to as "long-rectangular protrusions"). The line-like shape may consist of a straight line, a curve, or a combination of a straight line and a curve. The protrusions are not necessarily frame-like protrusions that surround the entirety of a part of the surface of the negative electrode current collector.

The negative electrode current collector may include spot-like protrusions. The spot-like protrusions are protrusions having a shape such that the ratio of the long side LL of a smallest rectangle that surrounds each of the protrusions to the short side SL of the rectangle (LL/SL) is less than 2 or the rectangle is square. Specific examples of the shape of the protrusions include, but are not limited to, a circle, an ellipse, and a polygon.

The line-like protrusions disposed on the first or second surface may be arranged substantially parallel to one another. In such a case, it becomes easy to hold the separator and create an adequate volume of space between each two adjacent protrusions. The expression "the line-like protrusions are arranged substantially parallel to one another" used herein means that the longitudinal directions of the protrusions are parallel to one another or the longitudinal directions of the protrusions form an acute angle of 30° or less with one another.

The line-like protrusions disposed on the first or second surface may be arranged in different directions that intersect one another. The expression "the line-like protrusions are arranged in different directions that intersect one another" used herein means that the acute angles formed by the longitudinal directions of the protrusions are larger than 30°. In the case where the first protrusions include a line-like first-a protrusion and a line-like first-b protrusion, the first-a and first-b protrusions may intersect each other on the first surface. Alternatively, a virtual first-va protrusion formed by extending the first-a protrusion in the longitudinal direction of the first-a protrusion may intersect a virtual first-vb protrusion formed by extending the first-b protrusion in the longitudinal direction of the first-b protrusion on the first surface. The virtual first-va and first-vb protrusions may intersect outside the first surface. In another case, the first-a protrusion may intersect the virtual first-vb protrusion on the first surface.

Figure 3:
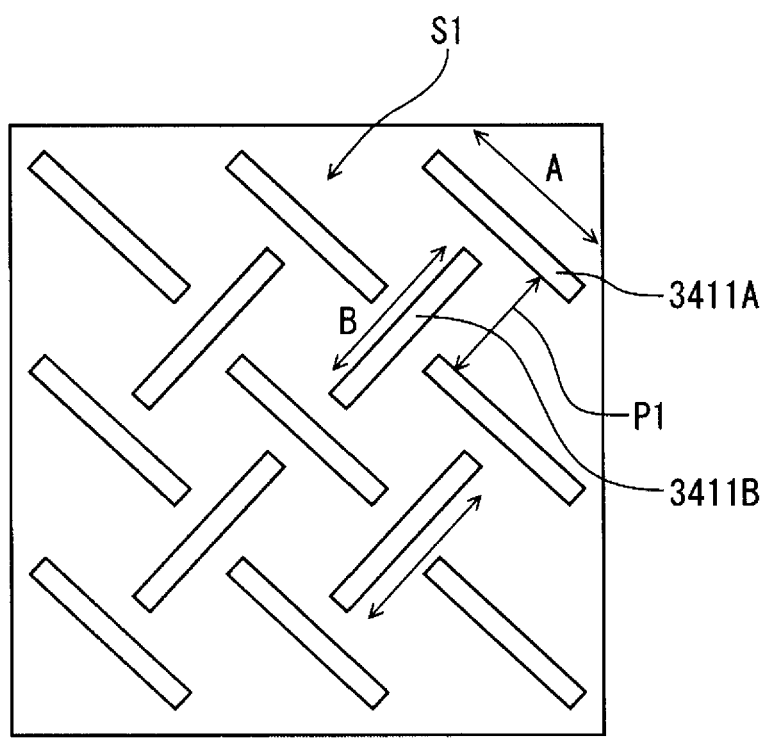
FIG. 3 is a schematic top plan view of a part of a negative electrode current collector according to still another embodiment of the present disclosure.

FIG. 3 is a schematic top plan view of a part of a negative electrode current collector according to still another embodiment of the present disclosure. The negative electrode current collector according to this embodiment may be any of the above-described negative electrode current collectors. In the negative electrode current collector illustrated in FIG. 3 as an example, first protrusions 3411A and first protrusions 3411B are long rectangular and arranged in different directions that intersect each other. The longitudinal direction A of the first protrusions 3411A and the longitudinal direction B of the first protrusions 3411B form an angle of 90°.

In FIG. 3, virtual first-va protrusions (not illustrated) formed by extending the first protrusions 3411A in the longitudinal direction A intersect the first protrusions 3411B on the first surface S1. From another viewpoint, virtual first-vb protrusions (not illustrated) formed by extending the first protrusions 3411B in the longitudinal direction B intersect the first protrusions 3411A on the first surface S1. The second protrusions (not illustrated) disposed on the second surface are arranged in the same manner as the first protrusions. The second protrusions disposed on the second surface may include second protrusions arranged parallel to the first protrusions 3411A and second protrusions arranged parallel to the first protrusions 3411B. Each of the second protrusions may be arranged to be displaced from the corresponding one of the first protrusions in the longitudinal direction A, in the longitudinal direction B, or in both longitudinal directions A and B.

In the above case, the average of the distance between each adjacent two of the first protrusions 3411A arranged parallel to each other and the distance between each adjacent two of the first protrusions 3411B arranged parallel to each other may be used as distance P1. The distance P2 may be determined in the same manner as the distance P1.

The first surface may include at least one band-like region which extends from a second edge of the negative electrode current collector to a third edge of the negative electrode current collector which is opposite to the second edge and in which the protrusions are not disposed (hereinafter, this band-like region referred to as "first band-like region"). Providing the first band-like region in which the protrusions are not disposed enables a nonaqueous electrolyte to move on the first surface uniformly. In the case where the electrode group is wound, a nonaqueous electrolyte may readily penetrate deep into the inside of the electrode group through the first band-like region. This enables the charge/discharge reaction to occur over the entirety of the electrode group and makes it easy to achieve a high battery capacity. In particular, in the case where the negative electrode current collector has a rectangular shape with two long sides and two short sides, the first band-like region may be formed in a second direction of the negative electrode current collector which connects the two short sides to each other. The second direction may be a direction that extends in the longitudinal direction of the negative electrode current collector. The number of the first band-like regions may be one or more.

It is considered that the first band-like region is present in the first surface when a virtual line (specifically, a straight line, a curve, or a combination of a straight line and a curve) that connects a point located on the second edge of the negative electrode current collector to a point located on the third edge of the negative electrode current collector without passing through any of the protrusions can be drawn in the first surface. The first band-like region may have a certain width (i.e., the length of the first band-like region in a direction perpendicular to the second direction) in order to facilitate the movement of a nonaqueous electrolyte.

The second direction is the direction of a straight line that connects a point located on the second edge of the negative electrode current collector and a point located on the third edge of the negative electrode current collector. The expression "the second direction extends in the longitudinal direction of the negative electrode current collector" used herein means that the acute angle formed by the second direction and the longitudinal direction of the negative electrode current collector is 30° or less.

Figure 4:
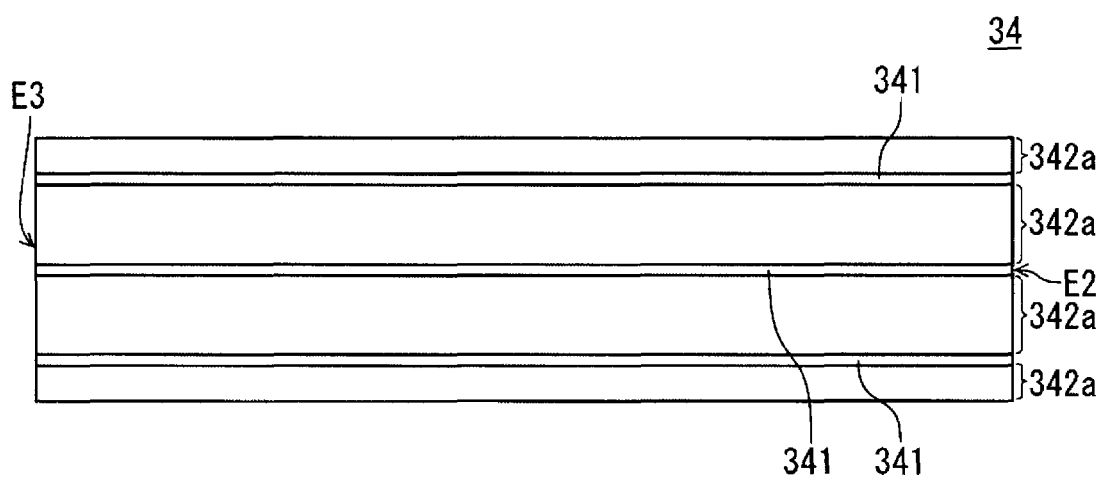
FIG. 4 is a schematic top plan view of a negative electrode current collector according to yet another embodiment of the present disclosure.

FIG. 4 is a schematic top plan view of a negative electrode current collector according to yet another embodiment of the present disclosure. The negative electrode current collector according to this embodiment may be any of the above-described negative electrode current collectors. As illustrated in FIG. 4, when the negative electrode current collector 34 includes a second edge E2 and a third edge E3 opposite to the second edge E2, the band-like region may be formed in the second direction that connects the second edge E2 to the third edge E3. That is, a band-like region 342$a$ that extends in the second direction may be formed on the surface of the negative electrode current collector 34. The band-like region 342$a$ is likely to be formed when the protrusions are arranged in a striped pattern. The surface of the negative electrode current collector 34 illustrated in FIG. 4 may be the first surface S1 or the second surface S2. The protrusions 341 are the first protrusions when the surface of the negative electrode current collector 34 illustrated in FIG. 4 is the first surface. The protrusions 341 are the second protrusions when the surface of the negative electrode current collector 34 illustrated in FIG. 4 is the second surface.

A region having a shape other than a band-like shape in which no protrusion is disposed may be optionally formed on the negative electrode current collector. For example, a negative electrode lead electrically connected to the negative electrode is connected to this region by welding or the like. The first protrusions may be arranged parallel to one another as illustrated in FIG. 4. The first protrusions may be arranged at the same distances. The second protrusions may be arranged parallel to one another. The second protrusions may be arranged at the same distances. The first protrusions may be arranged parallel to the second protrusions. The distance between two adjacent first protrusions may be equal to the distance between two adjacent second protrusions.

The ratio of the area of the protrusions to the area of the first or second surface may be 0.2% or more and 70% or less. The area ratio of the protrusions may be 1% or more or 3% or more. When the area ratio of the protrusions falls within the above range, the separator may be readily supported by the protrusions and the distance between the first or second surface and the separator may be readily maintained consistent. As a result, the expansion of the negative electrode may be further reduced. The area ratio of the protrusions may be 50% or less. When the area ratio of the protrusions falls within the above range, spaces may be readily created between the first or second surface and the separator. As a result, it may become possible to achieve a further high discharge capacity while reducing the expansion of the negative electrode which may be caused by the deposition of lithium metal. The above lower and upper limits may be combined with each other appropriately. The area of the first or second surface of the negative electrode current collector may be calculated before the negative electrode current collector is formed into an electrode group.

The size of the protrusions is not limited. For example, the size of the first protrusion may be determined such that, when viewed in the direction of the normal to the first surface, the ratio of the area of the first protrusion (in the case where first protrusions are present, the total area of the first protrusions viewed in the direction of the normal to the first surface) to the area of the first surface is 0.2% or more and 70% or less. The size of the second protrusion may be determined such that, when viewed in the direction of the normal to the second surface, the ratio of the area of the second protrusion (in the case where second protrusions are present, the total area of the second protrusions viewed in the direction of the normal to the second surface) to the area of the second surface is 0.2% or more and 70% or less.

Regions of the surfaces of the negative electrode current collector which do not face the positive electrode active material are not taken into account in the calculation of the area ratio of the protrusions. That is, the first and second surfaces do not include the regions of the surfaces of the negative electrode current collector which do not face the positive electrode active material. Thus, the regions that do not face the positive electrode active material are not taken into account in the calculation of the area of the first surface, the area of the second surface, and the area of the protrusions.

For example, when the electrode group is wound, the outer surface of a portion of the negative electrode current collector which serves as the outermost layer of the wound electrode group does not always face the positive electrode active material. In such a case, the outer surface of the portion of the negative electrode current collector which does not face the positive electrode active material is not taken into account in the calculation of the area of the first or second surface and the surface of the protrusions, because lithium metal is less likely to be deposited on the outer surface of the portion of the negative electrode current collector. Furthermore, the inner surface of a portion of the negative electrode current collector which serves as the innermost layer of the wound electrode group does not always face the positive electrode active material. In such a case, the inner surface of the portion of the negative electrode current collector which does not face the positive electrode active material is not taken into account in the calculation of the area of the first or second surface and the surface of the protrusions, because lithium metal is less likely to be deposited on the inner surface of the portion of the negative electrode current collector. The width of the negative electrode current collector in a direction parallel to the winding axis may be larger than the width of the positive electrode current collector. In such a case, at the upper and/or lower end of the electrode group (i.e., at one or both ends of the electrode group in a direction parallel to the winding axis), band-like regions of the surfaces of the negative electrode current collector which extend in the longitudinal direction of the negative electrode current collector (i.e., the direction perpendicular to the winding axis) do not face to the positive electrode active material. In such a case, the band-like regions are not taken into account in the area calculation.

The average height of the first protrusions above the first surface (hereinafter, this average height is referred to as "first average height") and the average height of the second protrusions above the second surface (hereinafter, this average height is referred to as "second average height") may be set in accordance with the amount of lithium metal that is deposited on the first and second surfaces. The first and second average heights may be set to 15 μm or more and 120 μm or less. The first and second average heights may be set to 20 μm or more or 30 μm or more. The first and second average heights may be set to 40 μm or more or 50 μm or more. When the first and second average heights fall within the above range, the change in the volume of the negative electrode which is caused by the deposition of lithium metal may be reduced in a further effective manner. Furthermore, the electrodes may be protected in a further effective manner. The first and second average heights may be set to 110 μm or less, 100 μm or less, or 90 μm or less. When the first and second average heights fall within the above range, the lithium metal deposited on the surfaces of the negative electrode current collector may be pressed by the separator at an adequate pressure and, consequently, the conductivity between the lithium metal and the negative electrode current collector may be increased. As a result, the charge/discharge efficiency may be increased. Moreover, the likelihood of the separator pressing the protrusions at an excessively high pressure may be reduced and, consequently, the electrodes may be protected. The above lower and upper limits may be combined with each other appropriately.

The first average height may be determined by, for example, selecting three random first protrusions in a cross-sectional image of the negative electrode current collector taken in the thickness direction, measuring the distance between the first surface and the edge of each of the protrusions as the height of the protrusion, and averaging the heights of the three first protrusions. The first average height may alternatively be determined by taking a piece of the negative electrode current collector having a certain area (e.g., 5 cm$^2$) in the first surface or pieces of the negative electrode current collector and averaging the heights of random first protrusions selected from the piece having a certain area or the pieces. In such a case, the first average height may be determined by taking cross-sectional images of the pieces having a certain area or the pieces, measuring the distance between the first surface and the edge of each of the first protrusions as the height of the first protrusion on the basis of the cross-sectional images, and averaging the heights of the first protrusions. The first protrusions that are to be measured may be arranged over the entirety of the first surface or only a part of the first surface.

In the case where the edges of the first protrusions are not flat, the maximum height of each of the first protrusions above the first surface is considered as the height of the first protrusion. The heights of the first protrusions may be measured on the basis of a cross-sectional image of the electrode group which covers a cross section of the negative electrode current collector taken in the thickness direction. The second average height may be determined as in the measurement of the first average height.

In the case where the first surface is rough, the surface roughness Rz of the first surface may be 1 μm or less. Similarly, in the case where the second surface is rough, the surface roughness Rz of the second surface may be 1 μm or less. The heights of the first protrusions may exceed 1 μm. The heights of the second protrusions may exceed 1 μm. In the case where the electrodes are wound, the heights of the first and second protrusions are measured after the electrode group has been unwound and spread such that the first and second surfaces become flat. In the case where the first surface is rough, the heights of the first protrusions are measured with respect to the top of the irregularities. Similarly, in the case where the second surface is rough, the heights of the second protrusions are measured with respect to the top of the irregularities.

The negative electrode current collector includes a conductive sheet (i.e., an examples of the layer) and the protrusions. Examples of the conductive sheet include a foil and a film.

The conductive sheet may have a flat and smooth surface. In such a case, the lithium metal derived from the positive electrode is likely to be deposited uniformly on the conductive sheet during charge. The expression "flat and smooth" used herein means that the maximum roughness height Rz of the conductive sheet is 20 μm or less. The maximum roughness height Rz of the conductive sheet may be 10 μm or less. Measurement of maximum roughness height Rz is conducted in accordance with JIS B 0601:2013.

The conductive sheet is composed of, for example, a conductive material other than lithium metal or a lithium alloy. The conductive material may be a metal material, such as a metal or an alloy. The conductive material may be a material that does not react with lithium. Examples of such a material include materials that do not react with lithium metal and/or a lithium ion. Specific examples thereof include a material that does not react with lithium to form an alloy or an intermetallic compound. Examples of such a conductive material include copper (Cu), nickel (Ni), iron (Fe), alloys of these metal elements, and graphite the basal plane of which is preferentially exposed. Examples of the alloy include a copper alloy and stainless steel (SUS). Copper and/or a copper alloy, which has a high conductivity, may be used as a conductive material in order to readily achieve a large battery capacity and a high charge/discharge efficiency. The conductive sheet may include one or more of the above conductive materials.

The thickness of the conductive sheet is not limited and may be, for example, 5 μm or more and 300 μm or less.

The protrusions may be composed of any material. The protrusions and the conductive sheet may be composed of different materials. Alternatively, the protrusions and the conductive sheet may be formed in one piece using the same material. The protrusions may be composed of a conductive material and/or an insulative material. The conductive material may be appropriately selected from the conductive materials described above as examples of the material of the conductive sheet. The above-described negative electrode current collector including the protrusions may be produced by, for example, forming the protrusions on the surfaces of the conductive sheet by press working or the like. The negative electrode current collector may alternatively be produced by applying a coating material that includes the conductive material onto the surfaces of the conductive sheet or putting a strip of tape composed of the conductive material onto the surfaces of the conductive sheet.

The protrusions may be composed of a resin material. The resin material may be insulative. When the protrusions are composed of an insulative material, such as a resin material, the deposition of lithium metal on the edges of the protrusions during charge may be reduced. The lithium metal deposited during charge is accommodated inside the negative electrode current collector, that is, specifically, in spaces created in the vicinity of the surfaces of the conductive sheet, such as a metal foil. This may further reduce the expansion of the negative electrode.

The resin material may be, for example, at least one resin material selected from the group consisting of an olefin resin, an acrylic resin, a polyamide resin, a polyimide resin, and a silicone resin. The resin material may be produced by curing a curable resin, such as an epoxy resin. The protrusions may be formed by, for example, putting strips of resin adhesive tape onto the surfaces of the conductive sheet. The protrusions may alternatively be formed by applying a solution or dispersion containing the resin material onto the surfaces of the conductive sheet and drying the resulting coating film. In another case, the protrusions may be formed by applying a curable resin onto the surfaces of the conductive sheet in a desired pattern and curing the resulting coating film.

A negative electrode mixture layer (not illustrated) may optionally be formed on the surfaces of the conductive sheet. In such a case, the negative electrode mixture and the conductive sheet correspond to an example of the layer. The negative electrode mixture layer may include lithium metal. The negative electrode mixture layer may be disposed over the entire surfaces of the conductive sheet. The negative electrode mixture layer may be formed by, for example, depositing lithium metal on a part or the entirety of the surfaces of the conductive sheet by electrodeposition, vapor deposition, or the like. The negative electrode mixture layer may alternatively be formed by, for example, applying a paste containing a negative electrode active material, such as graphite, onto a part or the entirety of the surfaces of the conductive sheet. The order in which the negative electrode mixture layer and the protrusions are formed is not limited. The protrusions may be formed subsequent to the formation of the negative electrode mixture layer. The negative electrode mixture layer may be formed subsequent to the formation of the protrusions. Note that the negative electrode mixture layer is formed so as not to cover the entire surfaces of the protrusions. The thickness of the negative electrode mixture layer is not limited and may be, for example, 30 to 300 μm. The negative electrode mixture layer may include a first surface. The negative electrode mixture layer may further include a second surface.

Positive Electrode

The positive electrode includes, for example, a positive electrode current collector and a positive electrode mixture layer disposed on the positive electrode current collector. The positive electrode mixture layer includes, for example, a positive electrode active material, a conductant agent, and a binder. The positive electrode mixture layer may be disposed on both surfaces of the positive electrode current collector. The positive electrode may be produced by, for example, applying a positive electrode mixture slurry that includes the positive electrode active material, the conductant agent, and the binder on both surfaces of the positive electrode current collector, drying the resulting coating films, and then performing rolling.

The positive electrode active material is capable of occluding and releasing lithium ions. Examples of the positive electrode active material include a lithium transition metal oxide, a transition metal fluoride, a polyanion, a fluorinated polyanion, and a transition metal sulfide. The positive electrode active material may be a lithium transition metal oxide, which is produced at low cost and offers a high average discharge voltage.

Examples of a transition metal element included in the lithium transition metal oxide include Sc, Ti, V, Cr, Mn, Fe, Co, Ni, Cu, Y, Zr, and W. The lithium transition metal oxide may include one or more transition metal elements. The transition metal element may be at least one element selected from the group consisting of Co, Ni, and Mn. The lithium transition metal oxide may optionally include one or more typical metal elements. Examples of the typical metal elements include Mg, Al, Ca, Zn, Ga, Ge, Sn, Sb, Pb, and Bi. The typical metal elements may be Al and the like.

Examples of the conductant agent include a carbon material. Examples of the carbon material include carbon black, acetylene black, KETJENBLACK, carbon nanotubes, and graphite. The positive electrode mixture layer may include one or more conductant agents.

Examples of the binder include a fluororesin, polyacrylonitrile, a polyimide resin, an acrylic resin, a polyolefin resin, and a rubber-like polymer. Examples of the fluororesin include polytetrafluoroethylene and polyvinylidene fluoride. The positive electrode mixture layer 31 may include one or more binders.

The positive electrode current collector may be composed of a metal material including, for example, Al, Ti, or Fe. Examples of such a metal material include Al, an Al alloy, Ti, a Ti alloy, and an Fe alloy. The Fe alloy may be SUS.

The positive electrode current collector may be, for example, a porous or nonporous sheet. Examples of a sheet of a metal material include a metal foil (i.e., a metal film) and a metal mesh. The carbon material described above as an example of the conductant agent may optionally be applied onto the surfaces of the positive electrode current collector. In such a case, for example, the resistance may be reduced. Moreover, catalytic effects may be achieved. In addition, the bond between the positive electrode mixture layer and the positive electrode current collector may be strengthened.

Separator

The separator is a porous sheet having ionic permeability and an insulating property. Examples of the porous sheet include a thin-film, a woven fabric, and a nonwoven fabric that have micropores formed therein. The separator may be composed of any material. The separator may be composed of a high-molecular material. Examples of the high-molecular material include an olefin resin, a polyamide resin, and cellulose. Examples of the olefin resin include polyethylene, polypropylene, and a copolymer of ethylene with propylene. The separator may optionally include an additive. Examples of the additive include an inorganic filler.

The separator may include layers having different structures and/or compositions. Examples of such a separator include a multilayer body constituted by a microporous polyethylene film and a microporous polypropylene film stacked on top of each other; and a multilayer body constituted by a nonwoven fabric including cellulose fibers and a nonwoven fabric including thermoplastic resin fibers which are stacked on top of each other. The separator may be produced by forming a polyamide resin film on the surface of a microporous film, a woven fabric, a nonwoven fabric, or the like. The above separators have high durability even when pressurized while being in contact with the protrusions. In order to enhance heat resistance and/or increase strength, a layer including an inorganic filler may be formed on the surface of the separator which faces the positive electrode and/or the surface of the separator which faces the negative electrode.

Nonaqueous Electrolyte

The nonaqueous electrolyte is conductive to lithium ions. The nonaqueous electrolyte includes a nonaqueous solvent and lithium ions and anions dissolved in the nonaqueous solvent. The nonaqueous electrolyte may be liquid or gelatinous. The nonaqueous electrolyte may be a solid electrolyte.

A nonaqueous liquid electrolyte may be prepared by dissolving a lithium salt in a nonaqueous solvent. While the lithium salt dissociate into lithium ions and anions when dissolved in the nonaqueous solvent, the nonaqueous electrolyte may include an undissociated lithium salt.

The gelatinous nonaqueous electrolyte may be a nonaqueous electrolyte including a lithium salt and a matrix polymer or a nonaqueous electrolyte including a lithium salt, a nonaqueous solvent, and a matrix polymer. The matrix polymer is, for example, a polymer material that gelatinizes upon absorbing the nonaqueous solvent. The polymer material may be at least one material selected from the group consisting of a fluororesin, an acrylic resin, and a polyether resin.

The lithium salt and the anions may be selected from known lithium salts and anions included in nonaqueous electrolytes for lithium secondary batteries. Examples of the anions include $BF_4^-$, $ClO_4^-$, $PF_6^-$, $CF_3SO_3^-$, $CF_3CO_2^-$, anions of imides, and anions of oxalates. Examples of the imide anion include $N(SO_2CF_3)_2^-$ and $N(C_mF_{2m+1}SO_2)_x(C_nF_{2n+1}SO_2)_y^-$, where m and n each independently represent an integer of 0 or more, x and y each independently represent 0, 1, or 2, and x+y=2. The oxalate complex anion may include boron and/or phosphorus. Examples of the oxalate complex anion include a bisoxalatoborate anion, $BF_2(C_2O_4)^-$, $PF_4(C_2O_4)^-$, and $PF_2(C_2O_4)_2^-$. The nonaqueous electrolyte may include one or more anions selected from the above anions.

In order to reduce the dendritic deposition of lithium metal, the nonaqueous electrolyte may include at least one anion selected from the group consisting of $PF_6^-$, anions of imides, and anions of oxalates. The imide anion may be $N(SO_2CF_3)_2^-$, $N(SO_2C_2F_5)_2^-$, or $N(SO_2F)_2^-$. In particular, when the nonaqueous electrolyte includes an oxalate complex anion, lithium metal is likely to be uniformly deposited in the form of fine particles, as a result of an interaction between the oxalate complex anion and lithium and, consequently, the likelihood of the negative electrode nonuniformly expanding due to the partial deposition of the lithium metal may be reduced. The oxalate complex anion may be used in combination with other anions. The other anions may be $PF_6^-$ and/or anions of imides.

Examples of the nonaqueous solvent include an ester, an ether, a nitrile, an amide, and halogenated derivatives thereof. The nonaqueous electrolyte may include one or more nonaqueous solvents selected from the above nonaqueous solvents. Examples of the halogenated derivatives include a fluoride.

Examples of the ester include a carbonate ester and a carboxylate ester. Examples of a cyclic carbonate ester include ethylene carbonate, propylene carbonate, and fluoroethylene carbonate (FEC). Examples of a chain carbonate ester include dimethyl carbonate (DMC), ethyl methyl carbonate (EMC), and diethyl carbonate. Examples of a cyclic carboxylate ester include γ-butyrolactone and γ-valerolactone. Examples of a chain carboxylate ester include ethyl acetate, methyl propionate, and methyl fluoropropionate.

Examples of the ether include a cyclic ether and a chain ether. Examples of the cyclic ether include 1,3-dioxolane, 4-methyl-1,3-dioxolane, tetrahydrofuran, and 2-methyltetrahydrofuran. Examples of the chain ether include 1,2-dimethoxyethane, diethyl ether, ethyl vinyl ether, methyl phenyl ether, benzyl ethyl ether, diphenyl ether, dibenzyl ether, 1,2-diethoxyethane, and diethylene glycol dimethyl ether.

The concentration of the lithium salt in the nonaqueous electrolyte is, for example, 0.5 mol/L or more and 3.5 mol/L or less. Note that, the lithium salt concentration is the sum of the concentration of dissociated lithium salt and the concentration of undissociated lithium salt. The anion concentration in the nonaqueous electrolyte may be 0.5 mol/L or more and 3.5 mol/L or less.

The nonaqueous electrolyte may include an additive. The additive may form a coating film on the negative electrode. Forming a coating film derived from the additive on the negative electrode may further reduce the formation of the dendrites. Examples of such an additive include vinylene carbonate, FEC, and vinyl ethyl carbonate (VEC). The above additives may be used alone or in combination of two or more.

Lithium Secondary Battery

A lithium secondary battery according to the present disclosure is described below with reference to the attached drawings, in which a cylindrical battery including a wound electrode group is illustrated as an example. However, the present disclosure is not limited by the lithium secondary battery described below.

Figure 5:
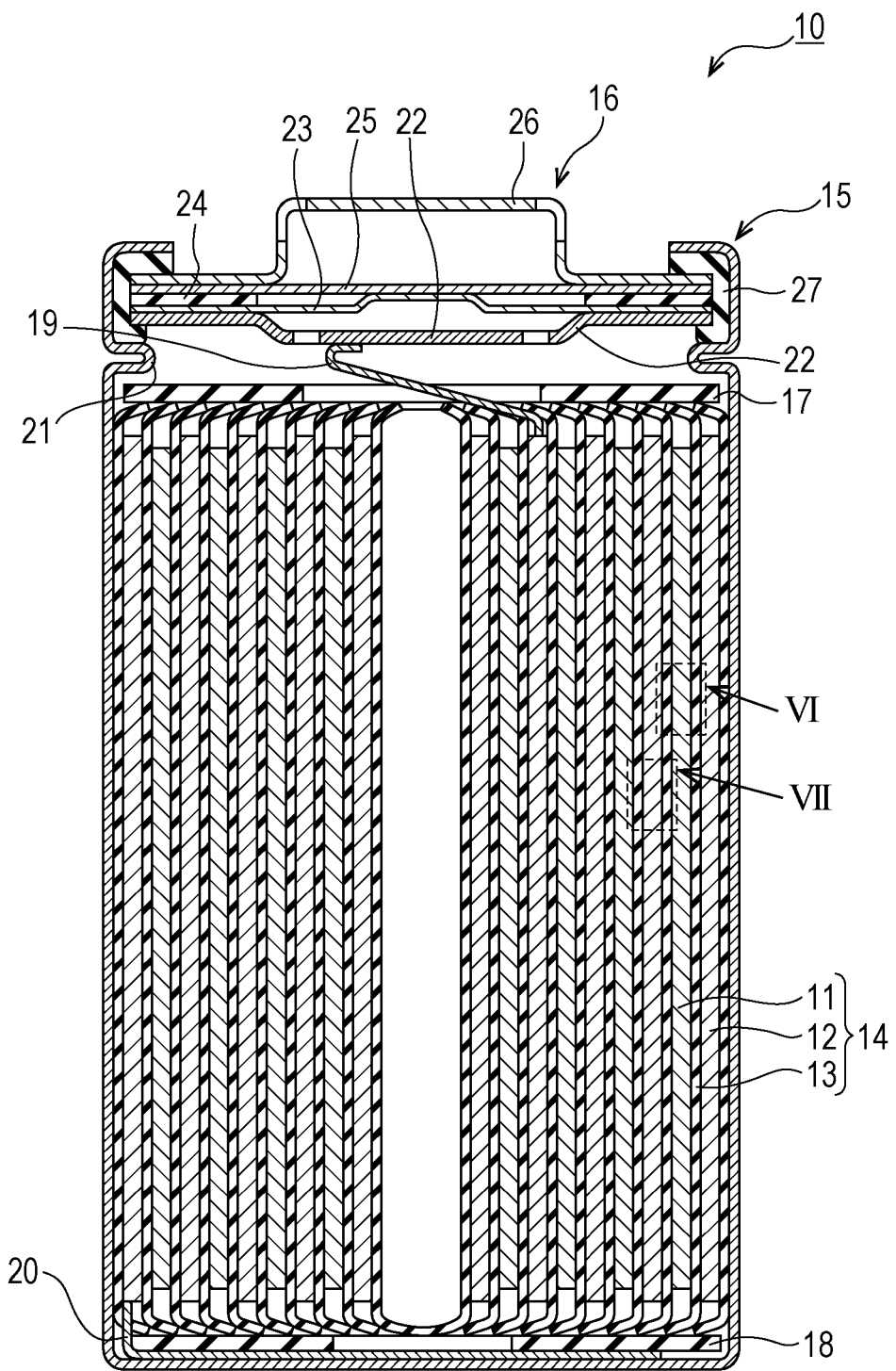
FIG. 5 is a schematic longitudinal cross-sectional view of a lithium secondary battery according to an embodiment of the present disclosure.
Figure 6:
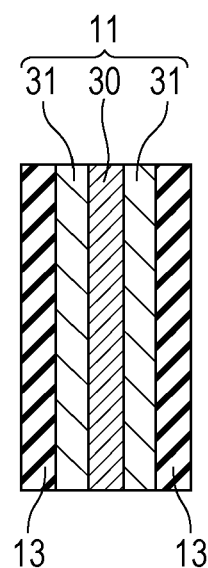
FIG. 6 is a schematic cross-sectional view of a positive electrode according to an embodiment of the present disclosure.
Figure 7:
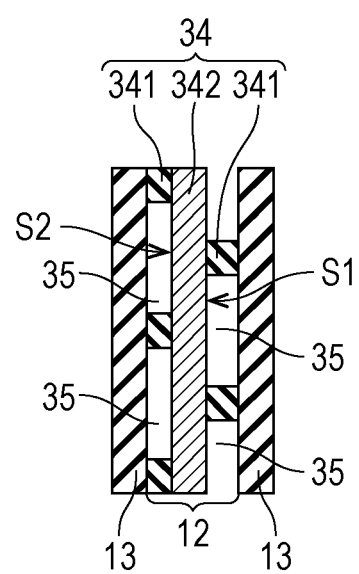
FIG. 7 is a schematic cross-sectional view of a negative electrode according to an embodiment of the present disclosure.

FIG. 5 is a longitudinal cross-sectional view of a lithium secondary battery 10, which is an example of the lithium secondary battery according to this embodiment. FIG. 6 is a schematic cross-sectional view of a positive electrode, which is an example of the positive electrode according to this embodiment. FIG. 7 is a schematic cross-sectional view of a negative electrode, which is an example of the negative electrode according to this embodiment. In the lithium secondary battery 10, lithium metal is deposited on a negative electrode 12 during charge and the lithium metal dissolves in a nonaqueous electrolyte (not illustrated) during discharge.

The lithium secondary battery 10 is a cylindrical battery that includes a cylindrical battery casing and a wound electrode group 14 and a nonaqueous electrolyte (not illustrated) that are accommodated in the battery casing. The battery casing includes a casing main body 15, which is a cylindrical metal container with a bottom, and a sealing plate 16 with which an opening formed in the casing main body 15 is sealed. A gasket 27 is disposed between the casing main body 15 and the sealing plate 16 in order to hermetically seal the battery casing. In the casing main body 15, insulating plates 17 and 18 are disposed at the respective edges of the electrode group 14 in the direction of the axis around which the electrode group 14 is wound.

The casing main body 15 includes a step 21 formed by, for example, pressing a portion of the side wall of the casing main body 15 from the outside of the casing main body 15. The step 21 may be formed on the side wall of the casing main body 15 in a circular shape in the circumferential direction of the casing main body 15. In such a case, the sealing plate 16 is supported by the opening-side surface of the step 21.

The sealing plate 16 includes a filter 22, a lower valve plate 23, an insulating member 24, an upper valve plate 25, and a cap 26, which are stacked on top of one another in this order. The sealing plate 16 is attached to the opening of the casing main body 15 such that the cap 26 is located on the outer side of the casing main body 15 and the filter 22 is located on the inner side of the casing main body 15. The above components of the sealing plate 16 may have, for example, a disc-like shape or a ring-like shape. The lower valve plate 23 and the upper valve plate 25 are connected to each other at the centers of the valve plates. The insulating member 24 is disposed between the lower valve plate 23 and the upper valve plate 25 in the circumferences of the valve plates. The filter 22 and the lower valve plate 23 are connected to each other at the centers of the filter 22 and the lower valve plate 23. The upper valve plate 25 and the cap 26 are connected to each other at the centers of the upper valve plate 25 and the cap 26. That is, the components other than the insulating member 24 are electrically connected to one another.

The lower valve plate 23 has a vent (not illustrated) formed therein. Therefore, if the internal pressure of the battery casing is increased due to anomalous heat generation or the like, the upper valve plate 25 bows toward the cap 26 and separates from the lower valve plate 23 and, as a result, the electrical connection between the lower valve plate 23 and the upper valve plate 25 becomes interrupted. If the internal pressure of the battery casing is further increased, the upper valve plate 25 may rupture and a gas may be discharged through an opening (not illustrated) formed in the cap 26.

The electrode group 14 includes a positive electrode 11, a negative electrode 12 that includes a negative electrode current collector 34, and a separator 13. The positive electrode 11, the negative electrode 12, the negative electrode current collector 34, and the separator 13 may be the above-described positive electrode, negative electrode, negative electrode current collector, and separator. The positive electrode 11, the negative electrode 12, and the separator 13 are band-like. The positive electrode 11 and the negative electrode 12 are wound into a spiral with the separator 13 disposed between the electrodes such that the width direction of the band-like positive electrode 11 and negative electrode 12 is parallel to the axis around which the electrodes are wound. In a cross section of the electrode group 14 which is orthogonal to the winding axis, the positive electrode 11 and the negative electrode 12 are alternately stacked on top of each other in the radial direction of the wound electrode group 14 with the separator 13 disposed between the electrodes. In other words, the longitudinal direction of the electrodes is parallel to the direction in which the electrode group 14 is wound, and the width direction of the electrodes is parallel to the direction of the axis around which the electrode group 14 is wound.

The positive electrode 11 is electrically connected to the cap 26, which serves also as a positive terminal, with a positive electrode lead 19. An end of the positive electrode lead 19 is connected to, for example, a portion of the positive electrode 11 which is in the vicinity of the center of the positive electrode 11 in the longitudinal direction. The positive electrode lead 19 extends from the positive electrode 11 to the filter 22 through a through-hole (not illustrated) formed in the insulating plate 17. The other end of the positive electrode lead 19 is welded to a surface of the filter 22 which faces the electrode group 14.

The negative electrode 12 is electrically connected to the casing main body 15, which serves also as a negative terminal, with a negative electrode lead 20. An end of the negative electrode lead 20 is connected to, for example, an edge of the negative electrode 12 in the longitudinal direction. The other end of the negative electrode lead 20 is welded to the inner bottom of the casing main body 15.

The positive electrode 11 includes a positive electrode current collector 30 and a positive electrode mixture layer 31 (see FIG. 6) and is electrically connected to the cap 26, which serves as a positive terminal, with a positive electrode lead 19. An end of the positive electrode lead 19 is connected to, for example, a portion of the positive electrode 11 which is in the vicinity of the center of the positive electrode 11 in the longitudinal direction. The positive electrode lead 19 extends from the positive electrode 11 to the filter 22 through a through-hole (not illustrated) formed in the insulating plate 17. The other end of the positive electrode lead 19 is welded to a surface of the filter 22 which faces the electrode group 14.

The negative electrode 12 includes the negative electrode current collector 34 (see FIG. 7) and is electrically connected to the casing main body 15, which serves as a negative terminal, with a negative electrode lead 20. The negative electrode current collector 34 includes a conductive sheet 342 and protrusions 341. An end of the negative electrode lead 20 is connected to, for example, an edge of the negative electrode 12 in the longitudinal direction. The other end of the negative electrode lead 20 is welded to the inner bottom of the casing main body 15.

The negative electrode current collector 34 includes protrusions 341 formed on the first surface S1 and the second surface S2. A space that is created between each adjacent two of the protrusions 341 and disposed between the first surface Si and the separator 13 or between the second surface S2 and the separator 13 forms a space 35. In the lithium secondary battery 10, lithium metal is deposited in the spaces 35 during charge and the lithium metal dissolves in the nonaqueous electrolyte during discharge. Since the spaces 35 are capable of accommodating the deposited lithium metal, the change in the apparent volume of the negative electrode 12 which is caused by the deposition of lithium metal may be reduced and, consequently, the expansion of the negative electrode may be reduced. Furthermore, in the electrode group 14, a pressure is applied to the lithium metal accommodated in the spaces 35 and, as a result, detachment of the lithium metal may be reduced. This may limit a reduction in charge/discharge efficiency.

The apparent volume of the negative electrode 12 is the sum of the volume of the negative electrode 12, the volume of the deposited lithium metal, and the total volume of the spaces created by the protrusions 341.

Others

Although a cylindrical lithium secondary battery that includes a wound electrode group is described above as an example with reference to the drawings, the lithium secondary battery according to the above-described embodiment is not limited to this. The shape of the lithium secondary battery may be selected from, for example, a cylindrical shape, a coin-like shape, a rectangular shape, a sheet-like shape, and a flat shape appropriately in accordance with the application and the like. The structure of the electrode group is not limited and may be multilayer. The components of the lithium secondary battery which are other than the electrode group or the nonaqueous electrolyte are not limited and may be selected from known components of lithium secondary batteries.

EXAMPLES

The lithium secondary battery according to the present disclosure is specifically described below on the basis of Examples and Comparative examples. The present disclosure is not limited by Examples below.

Example 1

(1) Preparation of Positive Electrode

A lithium transition metal oxide containing Li, Ni, Co, and Al (NCA) which served as a positive electrode active material, acetylene black (AB) which served as a conductant agent, and polyvinylidene fluoride (PVdF) which served as a binder were mixed at a mass ratio of NCA:AB:PVdF=95:2.5:2.5. An appropriate amount of N-methyl-2-pyrrolidone (NMP) was added to the resulting mixture. The mixture was stirred to form a positive electrode mixture slurry. The positive electrode mixture slurry was applied onto both surfaces of an Al foil used as a positive electrode current collector. The resulting coating films of the positive electrode mixture were dried and then rolled with a roller. The resulting multilayer body including the positive electrode current collector and the positive electrode mixture was cut into a predetermined electrode size. Hereby, a positive electrode that included a positive electrode current collector and positive electrode mixture layers disposed on both surfaces thereof was prepared.

(2) Preparation of Negative Electrode

A negative electrode current collector that included protrusions formed on both surfaces thereof as illustrated in FIG. 4 was prepared. Specifically, stripe-like protrusions were formed on the first and second surfaces by putting strips of polyethylene adhesive tape (thickness: 35 μm, width: 1 mm) onto both surfaces of a rectangular electrolytic copper foil (thickness: 10 μm) such that the adhesive tape strips were arranged parallel to one another at the same distances. That is, adhesive tape was used for forming protrusions. The adhesive tape strips disposed on the first surface were arranged parallel to those disposed on the second surface. The adhesive tape strips were arranged such that, when viewed in the direction of the normal to the first surface, the center line of each of the adhesive tape strips disposed on the first surface, the center line extending in the longitudinal direction of the adhesive tape strip, was displaced 0.5 mm in the width direction of the protrusions from the center line of a specific one of the adhesive tape strips disposed on the second surface which was closest to the adhesive tape strip disposed on the first surface, the center line extending in the longitudinal direction of the adhesive tape strip.

The minimum width of the first protrusions and the minimum width of the second protrusions were 1 mm. The distance P1 between each adjacent two of the first protrusions disposed on the first surface of the negative electrode current collector and the distance P2 between each adjacent two of the second protrusions disposed on the second surface of the negative electrode current collector were 5 mm. The ratio of the total area of a projection of the first protrusions on the first surface of the negative electrode current collector to the area of the first surface was 16.7%. The ratio of the total area of a projection of the second protrusions on the second surface of the negative electrode current collector to the area of the second surface was 16.7%.

The first protrusions disposed on the first surface and the second protrusions disposed on the second surface were positioned as illustrated in FIG. 1A. The distance (i.e., the gap G1) between the first side surface T1 of each of the first protrusions and the third side surface T3 of a corresponding one of the second protrusions was ½ of the first width W1. Thus, when viewed in the direction of the normal to the first surface, each of the first protrusions disposed on the first surface partly overlapped any of the second protrusions.

The resulting negative electrode current collector was cut into a predetermined electrode size. Hereby, a negative electrode current collector that included three stripe-like protrusions formed on each of the surfaces was prepared. An end of a nickel negative electrode lead was welded to the negative electrode current collector.

(3) Preparation of Nonaqueous Electrolyte

EC and DMC were mixed at a volume ratio of EC:DMC=30:70. In the resulting mixed solvent, $LiPF_6$ and $LiBF_2(C_2O_4)$ were dissolved such that the concentrations of $LiPF_6$ and $LiBF_2(C_2O_4)$ in the mixed solvent were 1 mol/L and 0.1 mol/L, respectively. Hereby, a nonaqueous liquid electrolyte was prepared.

(4) Preparation of Battery

An Al tab was attached to the positive electrode. A Ni tab was attached to the negative electrode. Subsequently, in an inert gas atmosphere, the positive and negative electrodes were wound into a spiral in a direction parallel to the longitudinal direction of the stripe-like protrusions with a polyethylene thin-film, which served as a separator, disposed between the electrodes. Hereby, a wound electrode body was prepared. In this electrode body, substantially all of the stripe-like protrusions were in contact with the separator. The electrode body was placed in a bag-like package composed of a laminated sheet including an Al layer. After the nonaqueous electrolyte had been charged into the package accommodating the electrode group, the package was sealed. Hereby, a lithium secondary battery was prepared.

Example 2

In (2) Preparation of Negative Electrode, the adhesive tape strips were arranged such that, when viewed in the direction of the normal to the first surface, the distance between the second side surface of each of the adhesive tape strips disposed on the first surface and the third side surface of a corresponding one of the adhesive tape strips disposed on the second surface was 1.25 mm. In other words, the adhesive tape strips were arranged such that, when viewed in the direction of the normal to the first surface, each of the adhesive tape strips disposed on the first surface did not overlap any of the adhesive tape strips disposed on the second surface. The first protrusions disposed on the first surface and the second protrusions disposed on the second surface were positioned as illustrated in FIG. 2. The gap G2 was ¼ of the distance P1. A lithium secondary battery was prepared as in Example 1, except for the gap of the adhesive tape strips disposed on the negative electrode.

Example 3

In (2) Preparation of Negative Electrode, the adhesive tape strips were arranged such that, when viewed in the direction of the normal to the first surface, the distance between the second side surface of each of the adhesive tape strips disposed on the first surface and the third side surface of a corresponding one of the adhesive tape strips disposed on the second surface was 2.5 mm. In other words, the adhesive tape strips were arranged such that, when viewed in the direction of the normal to the first surface, each of the adhesive tape strips disposed on the first surface did not overlap any of the adhesive tape strips disposed on the second surface. The first protrusions disposed on the first surface and the second protrusions disposed on the second surface were positioned as illustrated in FIG. 2. The gap G2 was ½ of the distance P1. A lithium secondary battery was prepared as in Example 1, except for the gap of the adhesive tape strips disposed on the negative electrode.

Comparative Example 1

A negative electrode and a lithium secondary battery were prepared as in Example 1, except that, in (2) Preparation of Negative Electrode, the adhesive tape strips were arranged such that, when viewed in the direction of the normal to the first surface, the adhesive tape strips disposed on the first surface completely overlapped the adhesive tape strips disposed on the second surface.

Comparative Example 2

In (2) Preparation of Negative Electrode, the adhesive tape strips were arranged such that, when viewed in the direction of the normal to the first surface, the center line of each of the adhesive tape strips disposed on the first surface, the center line extending in the longitudinal direction of the adhesive tape strip, was displaced 0.25 mm in the width direction of the protrusions from the center line of a specific one of the adhesive tape strips disposed on the second surface which was closest to the adhesive tape strip disposed on the first surface, the center line extending in the longitudinal direction of the adhesive tape strip. The first protrusions disposed on the first surface and the second protrusions disposed on the second surface were positioned as illustrated in FIG. 1A. The gap G1 was ¼ of the first width W1. A lithium secondary battery was prepared as in Example 1, except for the gap of the adhesive tape strips disposed on the negative electrode.

Evaluations

Each of the batteries was subjected to a charge/discharge test in order to determine the charge/discharge characteristics of the battery. In the charge/discharge test, the batteries were charged under the following conditions and subsequently, after an interval of 20 minutes, discharged under the following conditions in a thermostat set at 25° C.

Charge

Each of the batteries was charged with a constant current of 10 mA per unit area (square centimeters) of the electrodes until the battery voltage reached 4.3 V and subsequently charged with a constant voltage of 4.3 V until the current per unit area of the electrodes reached 1 mA.

Discharge

Each of the batteries was discharged with a constant current of 10 mA per unit area of the electrodes until the battery voltage reached 2.5 V.

The above charge and discharge were considered as one cycle. After the batteries had been charged in the second cycle, the batteries were disassembled and the negative electrode was taken from each of the batteries. The batteries were disassembled in an inert gas atmosphere. After the negative electrodes had been cleaned with DMC and then dried, the thicknesses of the negative electrodes were measured. The thickness of each of the negative electrodes was determined by measuring the thickness of the negative electrode at five random positions with a PEACOCK Digital Thickness Gauge G2-205M and taking the average. The ratio (%) of the thickness of the negative electrode measured in the second cycle to the thickness (100%) of the current collector of the negative electrode which was measured before the charge and discharge was determined as the negative electrode expansion coefficient. Table 1 summarizes the evaluation results.

TABLE 1

|  | Positional relationship of protrusions | Gap G1 | Gap G2 | Negative electrode expansion coefficient (%) |
|---|---|---|---|---|
| Example 1 | FIG. 1A | ½ × W1 | — | 120 |
| Example 2 | FIG. 2 | — | ¼ × P1 | 112 |
| Example 3 | FIG. 2 | — | ½ × P1 | 107 |
| Comparative example 1 | — | 0 | 0 | 138 |
| Comparative example 2 | FIG. 1A | ¼ × W1 | — | 136 |

Example 4

A negative electrode and a lithium secondary battery were prepared and evaluated as in Example 1, except that, in (2) Preparation of Negative Electrode, the distance P1 and the distance P2 were set to 10 mm. Table 2 summarizes the evaluation results. The first protrusions disposed on the first surface and the second protrusions disposed on the second surface were positioned as illustrated in FIG. 1A. The gap G1 was ½ of the first width W1.

Example 5

A negative electrode and a lithium secondary battery were prepared and evaluated as in Example 2, except that, in (2) Preparation of Negative Electrode, the distance P1 and the distance P2 were set to 10 mm and the adhesive tape strips were arranged such that, when viewed in the direction of the normal to the first surface, the distance between the second side surface of each of the adhesive tape strips disposed on the first surface and the third side surface of a corresponding one of the adhesive tape strips disposed on the second surface was 2.5 mm. Table 2 summarizes the evaluation results. The first protrusions disposed on the first surface and the second protrusions disposed on the second surface were positioned as illustrated in FIG. 2. The gap G2 was ¼ of the distance P1.

Example 6

A negative electrode and a lithium secondary battery were prepared and evaluated as in Example 3, except that, in (2) Preparation of Negative Electrode, the distance P1 and the distance P2 were set to 10 mm and the adhesive tape strips were arranged such that, when viewed in the direction of the normal to the first surface, the distance between the second side surface of each of the adhesive tape strips disposed on the first surface and the third side surface of a corresponding one of the adhesive tape strips disposed on the second surface was 5 mm. Table 2 summarizes the evaluation results. The first protrusions disposed on the first surface and the second protrusions disposed on the second surface were positioned as illustrated in FIG. 2. The gap G2 was ½ of the distance P1.

Comparative Example 3

A negative electrode and a lithium secondary battery were prepared and evaluated as in Comparative example 1, except that, in (2) Preparation of Negative Electrode, the distance P1 and the distance P2 were set to 10 mm. Table 2 summarizes the evaluation results.

Comparative Example 4

A negative electrode and a lithium secondary battery were prepared and evaluated as in Comparative example 2, except that, in (2) Preparation of Negative Electrode, the distance P1 and the distance P2 were set to 10 mm. Table 2 summarizes the evaluation results. The first protrusions disposed on the first surface and the second protrusions disposed on the second surface were positioned as illustrated in FIG. 1A. The gap G1 was ¼ of the first width W1.

TABLE 2

|  | Positional relationship of protrusions | Gap G1 | Gap G2 | Negative electrode expansion coefficient (%) |
|---|---|---|---|---|
| Example 4 | FIG. 1A | ½ × W1 | — | 122 |
| Example 5 | FIG. 2 | — | ¼ × P1 | 111 |
| Example 6 | FIG. 2 | — | ½ × P1 | 110 |
| Comparative example 3 | — | 0 | 0 | 139 |
| Comparative example 4 | FIG. 1A | ¼ × W1 | — | 138 |

Example 7

In (2) Preparation of Negative Electrode, a negative electrode current collector 34 that included protrusions 341 formed on both surfaces of the negative electrode current collector 34 as illustrated in FIG. 3 was prepared. Specifically, long-rectangular protrusions 341 were formed on the first and second surfaces by putting strips of polyethylene adhesive tape (thickness: 35 µm, width: 1 mm, length: 11 mm) onto both surfaces of a rectangular electrolytic copper foil (thickness: 10 µm) such that the longitudinal direction of some of the adhesive tape strips intersects the longitudinal direction of the other adhesive tape strips at an angle of 90°. The distance P1 and the distance P2 were about 6.4 mm. The adhesive tape strips were arranged such that, when viewed in the direction of the normal to the first surface, the center line of each of the adhesive tape strips disposed on the first surface, the center line extending in the longitudinal direction of the adhesive tape strip, was displaced 0.5 mm from the center line of a specific one of the adhesive tape strips disposed on the second surface which was closest to the adhesive tape strip disposed on the first surface, the center line extending in the longitudinal direction of the adhesive tape strip. Thus, when viewed in the direction of the normal to the first surface, each of the protrusions, that is, the adhesive tape strips, disposed on the first surface partly overlapped any of the protrusions disposed on the second surface. The first protrusions disposed on the first surface and the second protrusions disposed on the second surface were positioned as illustrated in FIG. 1A. The gap G1 was ½ of the first width W1.

A lithium secondary battery was prepared and evaluated as in Example 1, except that the negative electrode prepared in Example 7 was used. Table 3 summarizes the evaluation results.

Example 8

A negative electrode and a lithium secondary battery were prepared and evaluated as in Example 7, except that, in (2) Preparation of Negative Electrode, the adhesive tape strips were arranged such that, when viewed in the direction of the normal to the first surface, the distance between the second side surface of each of the adhesive tape strips disposed on the first surface and the third side surface of a corresponding one of the adhesive tape strips disposed on the second surface, which was parallel to the adhesive tape strip disposed on the first surface, was about 1.6 mm. Table 3 summarizes the evaluation results. The first protrusions disposed on the first surface and the second protrusions disposed on the second surface were positioned as illustrated in FIG. 2. The gap G2 was ¼ of the distance P1.

Example 9

A negative electrode and a lithium secondary battery were prepared and evaluated as in Example 7, except that, in (2) Preparation of Negative Electrode, the adhesive tape strips were arranged such that, when viewed in the direction of the normal to the first surface, the distance between the second side surface of each of the adhesive tape strips disposed on the first surface and the third side surface of a corresponding one of the adhesive tape strips disposed on the second surface was about 3.2 mm. Table 3 summarizes the evaluation results. The first protrusions disposed on the first surface and the second protrusions disposed on the second surface were positioned as illustrated in FIG. 2. The gap G2 was ½ of the distance P1.

Comparative Example 5

A negative electrode and a lithium secondary battery were prepared and evaluated as in Example 7, except that, in (2) Preparation of Negative Electrode, the adhesive tape strips were arranged such that, when viewed in the direction of the normal to the first surface, the adhesive tape strips disposed on the first surface completely overlapped the adhesive tape strips disposed on the second surface. Table 3 summarizes the evaluation results.

Comparative Example 6

A negative electrode and a lithium secondary battery were prepared and evaluated as in Example 7, except that, in (2) Preparation of Negative Electrode, the adhesive tape strips were arranged such that, when viewed in the direction of the normal to the first surface, the center line of each of the adhesive tape strips disposed on the first surface, the center line extending in the longitudinal direction of the adhesive tape strip, was displaced 0.25 mm in the width direction of the protrusions from the center line of a specific one of the adhesive tape strips disposed on the second surface which was closest to the adhesive tape strip disposed on the first surface, the center line extending in the longitudinal direction of the adhesive tape strip. Table 3 summarizes the evaluation results. The first protrusions disposed on the first surface and the second protrusions disposed on the second surface were positioned as illustrated in FIG. 1A. The gap G1 was ¼ of the first width W1.

TABLE 3

| | Positional relationship of protrusions | Gap G1 | Gap G2 | Negative electrode expansion coefficient (%) |
|---|---|---|---|---|
| Example 7 | FIG. 1A | ½ × W1 | — | 119 |
| Example 8 | FIG. 2 | — | ¼+33P1 | 110 |
| Example 9 | FIG. 2 | — | ½ × P1 | 106 |
| Comparative example 5 | — | 0 | 0 | 139 |
| Comparative example 6 | FIG. 1A | ¼ × W1 | — | 137 |

The results described in Tables 1 to 3 confirm that the expansion of each of the negative electrodes included in the batteries prepared in Examples 1 to 9 was smaller than that of any of the negative electrodes included in the batteries prepared in Comparative examples 1 to 6. The larger the gap G1 or G2 between the protrusions disposed on one of the surfaces of the negative electrode current collector and the protrusions disposed on the other surface, the smaller the expansion of the battery. The batteries prepared in Examples 2 and 3, 5 and 6, and 8 and 9 had a particularly small expansion.

Since the lithium secondary battery according to the present disclosure may reduce the expansion of the electrode, have a large discharge capacity, and be excellent in terms of safety, it may be used in, for example, electronic devices, such as mobile phones, smartphones, and tablet terminals; electric vehicles, such as hybrid electric vehicles and plug-in hybrid electric vehicles; and home storage batteries used in combination with solar batteries.

What is claimed is:

1. A lithium secondary battery comprising:
   a positive electrode containing a positive electrode active material containing lithium;
   a negative electrode facing the positive electrode, the negative electrode including a negative electrode current collector;
   a separator disposed between the positive and negative electrodes; and
   a nonaqueous electrolyte having lithium-ion conductivity, wherein
   the negative electrode current collector includes:
      a layer having a first surface and a second surface opposite to the first surface;
      first protrusions protruding from the first surface; and
      second protrusions protruding from the second surface,
   the first and second surfaces are surfaces on which lithium metal is deposited during charge, and
   when viewed in a direction of a normal to the first surface, a total area of overlap between the first protrusions and the second protrusions is ½ or less of a total area of the first protrusions,
   the first protrusions each have a line-like shape that extends in a longitudinal direction of the negative electrode current collector, the first protrusions each being a protrusion that connects two opposite outer edges of the negative electrode current collector to each other, and
   the second protrusions each have a line-like shape that extends in the longitudinal direction of the negative electrode current collector, the second protrusions each being a protrusion that connects the two opposite outer edges of the negative electrode current collector to each other.

2. The lithium secondary battery according to claim 1, wherein, when viewed in the direction of the normal to the first surface, each of the first protrusions has a first side and a second side opposite to the first side, the first and second sides extending in a longitudinal direction of the line-like shape of the first protrusions, and at least one of the first protrusions includes a region that extends ½ of the distance between the first and second sides from the first side toward the second side, and that does not overlap any of the second protrusions.

3. The lithium secondary battery according to claim 1, wherein, when viewed in the direction of the normal to the first surface, each of the first protrusions has a first side and a second side opposite to the first side, the first and second sides extending in a longitudinal direction of the line-like shape of the first protrusions, and each of the first protrusions includes a region that extends ½ of the distance between the first and second sides from the first side toward the second side, and that does not overlap any of the second protrusions.

4. The lithium secondary battery according to claim 1, wherein the first protrusions are composed of a material different from a material of which the layer is composed, and the second protrusions are composed of a material different from the material of which the layer is composed.

5. The lithium secondary battery according to claim 1, wherein the first and second protrusions are composed of a resin material.

6. The lithium secondary battery according to claim 1, wherein the layer, the first protrusions, and the second protrusions are formed in one piece using the same material.

7. The lithium secondary battery according to claim 1, wherein, when viewed in the direction of the normal to the first surface, at least one of the first protrusions does not overlap any of the second protrusions.

8. The lithium secondary battery according to claim 1, wherein, when viewed in the direction of the normal to the first surface, each of the first protrusions does not overlap any of the second protrusions.

9. A lithium secondary battery comprising:
a positive electrode containing a positive electrode active material containing lithium;
a negative electrode facing the positive electrode, the negative electrode including a negative electrode current collector;
a separator disposed between the positive and negative electrodes; and
a nonaqueous electrolyte having lithium-ion conductivity, wherein the negative electrode current collector includes:
a layer having a first surface and a second surface opposite to the first surface;
first protrusions protruding from the first surface; and
second protrusions protruding from the second surface, the first and second surfaces are surfaces on which lithium metal is deposited during charge, when viewed in a direction of a normal to the first surface, a total area of overlap between the first protrusions and the second protrusions is ½ or less of a total area of the first protrusions, the first protrusions include third protrusions and fourth protrusions, when viewed in the direction of the normal to the first surface, the third protrusions and fourth protrusions each have a long-rectangular shape, and a longitudinal direction of the third protrusions and a longitudinal direction of the fourth protrusions are different and intersect with each other, the second protrusions include fifth protrusions and sixth protrusions, and when viewed in the direction of the normal to the first surface, the fifth protrusions and sixth protrusions each have a long-rectangular shape, and a longitudinal direction of the fifth protrusions and a longitudinal direction of the sixth protrusions are different and intersect with each other.

10. The lithium secondary battery according to claim 9, wherein the first protrusions are composed of a material different from a material of which the layer is composed, and the second protrusions are composed of a material different from the material of which the layer is composed.

11. The lithium secondary battery according to claim 9, wherein the first and second protrusions are composed of a resin material.

12. The lithium secondary battery according to claim 9, wherein the layer, the first protrusions, and the second protrusions are formed in one piece using the same material.

13. The lithium secondary battery according to claim 9, wherein, when viewed in the direction of the normal to the first surface, at least one of the first protrusions does not overlap any of the second protrusions.

14. The lithium secondary battery according to claim 9, wherein, when viewed in the direction of the normal to the first surface, each of the first protrusions does not overlap any of the second protrusions.

* * * * *